United States Patent
Duff et al.

(10) Patent No.: US 7,138,936 B2
(45) Date of Patent: Nov. 21, 2006

(54) METHOD AND APPARATUS FOR PROTECTING PERSONNEL FROM RF-TRIGGERED EXPLOSIVE DEVICES (RTED) USING ULTRA-WIDEBAND (UWB) TRANSMISSION

(75) Inventors: William G. Duff, Fairfax Station, VA (US); Theodore L. Harwood, II, Hollywood, MD (US); Art Light, Oakton, VA (US); John P. Smith, Millersville, MD (US); Darrel Crapps, Mitchellville, MD (US)

(73) Assignee: Sentel Corporation, Alexandria, VA (US)

( * ) Notice: Subject to any disclaimer, the term of this patent is extended or adjusted under 35 U.S.C. 154(b) by 0 days.

(21) Appl. No.: 11/084,275

(22) Filed: Mar. 18, 2005

(65) Prior Publication Data

US 2006/0164282 A1 Jul. 27, 2006

Related U.S. Application Data

(60) Provisional application No. 60/647,342, filed on Jan. 26, 2005.

(51) Int. Cl.
*H04K 3/00* (2006.01)
*G01S 7/00* (2006.01)

(52) U.S. Cl. .......................... 342/14; 342/13; 342/175; 342/195; 455/1; 89/1.11

(58) Field of Classification Search ................ 455/1, 455/403, 422.1, 423, 425, 456.1, 456.4; 342/13–20, 342/89–103, 175, 192–197, 61, 68, 82–88, 342/21; 89/1.11

See application file for complete search history.

(56) References Cited

U.S. PATENT DOCUMENTS

| 3,728,632 | A | | 4/1973 | Ross |
| 4,121,214 | A | * | 10/1978 | Marinaccio et al. .......... 342/15 |
| 5,361,070 | A | | 11/1994 | McEwan |
| 6,112,052 | A | * | 8/2000 | Guthrie et al. ................. 455/1 |
| 6,195,529 | B1 | * | 2/2001 | Linz et al. ..................... 455/1 |
| 6,222,458 | B1 | * | 4/2001 | Harris ..................... 455/422.1 |
| 6,393,254 | B1 | * | 5/2002 | Pousada Carballo et al. ... 455/1 |
| 6,456,822 | B1 | * | 9/2002 | Gofman et al. ................ 455/1 |
| 6,490,455 | B1 | * | 12/2002 | Park et al. ............... 455/456.4 |
| 6,496,703 | B1 | * | 12/2002 | da Silva ................. 455/456.4 |

(Continued)

OTHER PUBLICATIONS

Defense Advanced Research Projects Agency (DARPA)—Advanced Technology Office. "NETEX: Networking in Extreme Environments"; NETEX website: www.darpa.mil/ato/programs/NETEX/DT.htm.

(Continued)

*Primary Examiner*—Bernarr E. Gregory
(74) *Attorney, Agent, or Firm*—Roberts Mardula & Wertheim, LLC

(57) ABSTRACT

The test results found that the EMI impact depended on the UWB power that fell within the receiver passband. Specifically, EMI occurred when the average power in the receiver passband was approximately equal to the desired signal level of the receiver. One waveform, TW7, did not cause EMI because the average power was too low. Three waveforms, TW1, TW2, and TW6 only caused EMI when the receiver was tuned to the frequency of the UWB spectral component. Three waveforms, TW3, TW4, and TW5, caused EMI at all receiver frequencies. As noted, these tests were performed to determine the susceptibility of various RF receiver (radars and communications systems) devices to UWB signals. The tests were not intended to evaluate the use of UWB signals for jamming purposes.

21 Claims, 3 Drawing Sheets

U.S. PATENT DOCUMENTS

| | | | |
|---|---|---|---|
| 6,687,506 B1 * | 2/2004 | Girod | 455/456.4 |
| 6,870,889 B1 * | 3/2005 | Sugiura | 455/1 |
| 2002/0086635 A1 * | 7/2002 | Tomono | 455/1 |

OTHER PUBLICATIONS

Defense Advanced Research Projects Agency (DARPA)—Advanced Technology Office. Slideshow, "What is UWB?"; NETEX website: www.darpa.mil/ato/programs/NETEX/DT.htm.

Consumer Microcircuits Limited. "Continuous Tone Controlled Squelch System 'Type 2': A Manufacturers' Guide to Features and Implementation. " May 1, 1999 (Essex, England).

Robert J. Fontana, Edward A. Richley, Lance C. Beard, JoAnn Barney. "A Programmable Ultra Wideband Signal Generator for Electromagnetic Susceptibility Testing." 2003 IEEE Conference on Ultra Wideband Systems and Technologies, Nov. 2003 (Reston, VA).

* cited by examiner

METHOD AND APPARATUS FOR PROTECTING PERSONNEL FROM RF-TRIGGERED EXPLOSIVE DEVICES (RTED) USING ULTRA-WIDEBAND (UWB) TRANSMISSION

CROSS REFERENCE TO RELATED APPLICATIONS

This application claims priority under 35 U.S.C. § 119(e) from provisional application No. 60/647,342 filed Jan. 26, 2005. The 60/647,342 application is incorporated by reference herein, in its entirety, for all purposes.

BACKGROUND

Embodiments of the present invention are directed to radio frequency (RF) jamming. More particularly, embodiments of the present invention are directed to jamming RF switching devices used to trigger RF-triggered explosive devices (RTEDs).

Modern war-fighters are increasingly confronting attacks from RTEDs, particularly devices that use improvised triggering mechanisms. These "booby traps" are often triggered by RF switching devices found in ordinary household items such as garage-door openers and radio-controlled (RC) toy vehicles. RFTDs can be very effective because they are difficult to detect and to counter.

During the Gulf War, coalition forces encountered significant numbers of booby traps and improvised RTEDs. Most of these devices were located in numerous bunker complexes. By way of illustration, a common improvised RTED consists of booby-trapped 5-gallon cans of napalm actuated by a RF receiving device such as a RC toy actuator or a garage door opener. Another common booby trap encountered involved daisy chaining a group of Valmara 69 antipersonnel (AP) fragmentation mines, again actuated by a RF receiver.

The proficiency of attacks in war zones has increased in frequency with many of the attacks directed toward interdicting convoys.

In response to the use of these RTEDs, field commanders began trying to protect themselves by using RF transmitters, such as toy car remote controls, to attempt to pre-detonate RTEDs. While this worked in some cases, many devices like garage-door transmitters and car alarms use rolling codes or other "protected" RF transmissions that are difficult to predict or duplicate and do not operate at the same frequencies as the RC toy controllers. This greatly increased the number of types and frequencies of the RF jammers needed to attempt to protect a vehicle or convoy.

Typically, improvised RTEDs are remotely detonated using relatively simple, readily available low-technology devices, such as garage door openers, car alarms, Remote Keyless Entry (RKE) devices, door bells, RC toy car remotes, family radio service (FRS) and general mobile radio service (GMRS) two-way radios, cellular telephones, and pagers—all of which can be used to enable radio frequency command detonation (RFCD). Therefore, this implies that observation of the target area probably requires line-of-sight (LOS) observation points in many cases. However, the adaptation of using radios, cell phones, and other RC devices has given the enemy the standoff ability to watch forces from a distance and not be compromised.

The type of RF switching devices of concern are cheap, simple, small, low power, limited range (from 10 to 200 meters) and operate in various frequency bands from HF (3–30 MHz) through UHF (300–3000 MHz). Most of these devices operate with a simple On-Off-Keying (OOK) or Frequency-Shift-Keying (FSK) modulation. They typically initiate commands based on bit streams consisting of a series of pulses from the remote keying device. For most RF switching devices and RKEs, the receiver must receive two full consecutive correct bit streams, with each bit stream lasting for tens of milliseconds. If a bit in either bit stream is not received correctly, the receiving device will not activate.

The RF characteristics for several of these devices are presented below.

Remote Keyless Entry (US/EUROPE):
315 MHz –433 MHz,
1 mW Transmit Power,
25–100 kHz Bandwidth (BW),
Range to 100 m,
Superheterodyne Receiver (Local Oscillator) Sleep/Wake Mode (To Conserve Battery Power),
Receiver needs to receive 2 full bit streams to perform intended function.

Garage Door Openers:
27 MHz–433 MHz,
1 mW Transmit Power,
25–100 kHz Bandwidth,
Range to 200 m,
Superheterodyne Receiver (Local Oscillator) on At All Times,
Receiver needs to receive 2 full bit streams to perform intended function.

Cordless Phones:
800 MHz–5.8 GHz,
100 mW Transmit Power,
50 kHz–500 kHz Bandwidth,
Range to 200 m,
Superheterodyne Receiver (Local Oscillator) on at all times.

The receivers of most RF switching devices and RKEs are superheterodyne receivers consisting of an antenna, an RF Filter, an RF amplifier, a mixer, a local oscillator, an intermediate frequency (IF) filter, and an IF amplifier. There are several ways to interfere with a superheterodyne receiver. Low-level interference sources on the same or adjacent channels can cause electromagnetic interference (EMI). Also high-level out-of-band signals can saturate the RF amplifier, causing desensitization, cross-modulation, or intermodulation products that cause EMI. These EMI interactions are antenna-induced products (i.e., the antenna is in the path from the interferer to the receiver). Another cause of EMI is high-level signals at the IF of the receiver which penetrate the body of the receiver. This interaction does not include the antenna and is commonly called "back-door" interference.

Large and expensive efforts have been undertaken by the military to address the RTED problem. However, all of the present solutions are very sophisticated, require large pieces of equipment, and are quite costly at over $500,000 per unit. A simpler, smaller, and cheaper solution would be highly desirable.

In other developments, Ultra-Wide Band (UWB) technology has also progressed in recent years. UWB technology has its origins in the development of time-domain (impulse response) techniques for the characterization of linear, time-invariant microwave structures. The advent of the time-domain sampling oscilloscope (Hewlett-Packard c. 1962) and the development of techniques for sub-nanosecond (baseband) pulse generation provided the requisite tools for further basic research. While there is no single definition of what constitutes a UWB transmitter, the Federal Communications Commission (FCC) uses the following definition for regulatory purposes:

An intentional radiator that, at any point in time, has a fractional bandwidth equal to or greater than 0.20 or has a UWB bandwidth equal to or greater than 500 MHz, regardless of the fractional bandwidth. 47 CFR 15.503 (d).

In the early 1970's, impulse or baseband techniques were applied to a large number of potential applications ranging from low cost, high-resolution radar to specialized communications systems having low probability of detection (LPD) and low probability of interference (LPI). Within the United States, much of the early work in the UWB field (prior to 1994), particularly in the area of impulse communications, was performed under classified U.S. Government programs. Since 1994, much of the work has been carried out without classification restrictions, and the development of UWB technology has greatly accelerated. Recent UWB improvements have come about in the fields of communications, radar, and localization. Numerous manufacturers have begun producing UWB chips and the cost of UWB devices has decreased. UWB chip manufacturers include Motorola's newly spun-off chip unit, Freescale Semiconductor (XtremeSpectrum), Alereon, Staccato Communications, Wisair, FOCUS Enhancements, Inc., Jazz Semiconductor, Advanced Semiconductor Manufacturing Corporation, Hua Hong NEC Electronics Co., Ltd, and Intel Corporation.

A summary of some UWB applications, for both the military and commercial markets, is presented below:

Commercial Applications:
High Speed (20+Mb/s) local area networks (LANs) and wide area networks (WANs)
Altimeter/Obstacle Avoidance Radars (commercial aviation)
Collision Avoidance Sensors
RF Identification
Intelligent Transportation Systems
Intrusion Detection Radars a Precision Geolocation Systems
Industrial RF Monitoring Systems Military/Government Applications:
Tactical Handheld & Network LPI/D Radios
Non-LOS LPI/D Groundwave Communications
LPI/D Altimeter/Obstacle Avoidance Radar
RF Identification
Intrusion Detection Radars
Precision Geolocation Systems
Unmanned Aerial Vehicle (UAV)/Unmanned Ground Vehicle (UGV) Datalinks
Proximity Fuses
LPI/D Wireless Intercom Systems The major advantages and disadvantages of UWB systems both result from the wide bandwidths associated with the ultra-short pulse waveforms that are used in most implementations of UWB technology. Although these ultra-short pulses result in the potential for high data rates for communicating and high-resolution imaging for radar applications, their associated wide bandwidths result in a potential for EMI over a wide range of frequencies. It is anticipated that UWB signals will be effective in interfering with the operation of these RF switching devices and RKEs because some portion of the UWB energy will be on-tune (thereby lowest power required to induce EMI) to the respective RF switching device and RKE receivers.

The RF characteristics for UWB devices are presented below:
Wideband Controlled Spectral Content (kHz To GHz)
High Peak Power (Effective Jamming) measured in units of Watts.
Low Average Power, measured in units of less than 1 mW.
Small Size, low power and low weight.

Although it is often regarded as new technology, the basic UWB technology has been around as long as wireless. Marconi's original spark transmission and all early wireless telegraphy were UWB. The military spent years investigating the application of UWB signals for high-resolution "carrier free" radar systems. Applications for UWB may be categorized as radar, location, and data communications.

UWB systems provide a potential for improved performance compared to legacy systems for certain military radio communication and sensing systems functions. However, the UWB systems also pose a potential threat to legacy systems because of potential EMI problems. The objective of the Defense Advanced Research Projects Agency (DARPA) Networking in Extreme Environments (NETEX) program was to create a wireless networking technology for the military user that enables robust connectivity in a wide spectrum of environments and support its integration into new and emerging sensor and communication systems. The NETEX effort investigated the susceptibility of selected military communication, navigation, and radar receivers to EMI from various UWB waveforms. The results of this investigation implied that UWB devices can easily cause EMI in legacy systems. The test also defined the UWB system parameters that caused the most effective EMI. The results of these tests demonstrated that UWB can be used effectively to interfere with simple RF switching devices and RKEs.

Seventeen selected military systems were tested to determine the susceptibility of legacy receivers to the very narrow pulses (and pulse trains) of transmitters associated with UWB systems. The selected military systems provided a representative sample of communications, navigation, and radar systems that are currently used in military applications. Typical parameters that influence receiver susceptibility are the sensitivity of the receiver, the levels of the desired and interfering signal sources, frequency and modulation of the desired signal source, pulse repetition frequency (PRF) of the UWB source, receiver bandwidth and operating frequency, and threshold levels associated with any responses.

The basic approach utilized during the NETEX testing was to subject each of the selected receivers to a number of "worst case" UWB waveforms and determine the conditions that cause EMI effects in the receiver. The results of these tests defined the receiver susceptibility threshold to these waveforms when the UWB emitter was connected directly to the receive antenna port (through a variable attenuator).

DARPA conducted over 1600 individual tests for different modes (39), at fixed frequencies (65) and during frequency hopping (5), and frequency ranges between 30 MHz and 16 GHz using 7 generic UWB waveforms. These UWB signal parameters were specified relative to selected victim RF and IFs. The UWB signal levels were not limited to FCC rules.

The tested generic UWB waveforms were as follows:
TW1—PRF is equal to, or a sub-harmonic of, the test frequency with no modulation or dithering of the PRF.
TW2—PRF is equal to, or a sub-harmonic of, the test frequency with the PRF waveform dithered +/−10%.
TW3—PRF is equal to the IF bandwidth of receiver under test with the PRF waveform dithered +/−1%.

TW4—PRF is equal to the IF bandwidth with PRF frequency modulated (FM)

TW5—PRF is equal to one tenth of the IF bandwidth with no modulation or dithering on PRF.

TW6—PRF is equal to ten times the IF bandwidth with no modulation or dithering on PRF.

TW7—PRF is equal to one hundredth of the IF bandwidth with no modulation or dithering on PRF.

The tests performed measured receiver sensitivity, receiver susceptibility to white noise, receiver susceptibility to a small UWB signal (where the UWB is increased until it upsets the receiver and is then decreased until the receiver reacquires the desired signal), and receiver susceptibility to a large UWB signal (where the desired signal is increased until the receiver acquires it and then decreased until the signal reception at the receiver is upset).

The test results found that the EMI impact depended on the UWB power that fell within the receiver passband. As noted, these tests were performed to determine the susceptibility of various RF receiver (radars and communications systems) devices to UWB signals. The tests were not intended to evaluate the use of UWB signals for jamming purposes.

What would be useful would be a jamming system that would thwart the detonation of RTEDs using RF switching devices. Such jamming system would also be portable, use relatively small power sources, and be effective against a wide range of RF switching devices.

SUMMARY

According to embodiments of the present invention, an ultra wideband (UWB) jamming system comprises a processor, a memory, a pulse generator, a UWB transmitter, and a UWB antenna. The UWB jamming system uses UWB signals to create errors in the code received by an RTED receiving device before the RTED trigger signal can cause the RTED to detonate. According to embodiments of the present invention, an RTED may be improvised or manufactured without departing from the scope of the present invention.

It is an aspect of the invention to use UWB controlled spectral content to block RF links used by RTEDs in the kHz to GHz ranges simultaneously.

It is a further aspect of the invention to utilize peak power of UWB to provide effective jamming of the RF links used by RTEDs.

It is yet another aspect of the present invention that the UWB waveforms use the high peak power and the low average power of UWB to provide efficient jamming of the RF links used by RTEDs, resulting in smaller size and less battery power required.

It is another aspect of the invention to block the various RF links used to trigger RTEDs with a UWB device having low average power and low weight.

It is an aspect of the present invention to receive updated interference parameter sets via a wireless network link.

It is another aspect of the present invention to receive an assessment of the risk of the presence of an RTED at a particular location via a wireless network link and to adjust an interference parameter set based on the risk assessment for that location.

It is still another aspect of the invention to utilize commercial/military/government UWB capabilities during the period of time that the invention is not operating in a jamming mode.

An embodiment of the present invention provides a method of protecting personnel from RF-triggered explosive devices (RTEDs). According to embodiments of the present invention, an RTED may be improvised or manufactured without departing from the scope of the present invention.

Predetermined interference parameters are associated with an RTED transmission signal, wherein the RTED transmission signal comprises a bit stream. A UWB signal is created using the predetermined interference parameters and transmitted thereby interfering with the reception of the bit stream by an RTED receiver. In embodiments of the present invention, the transmission signal is selected from the group consisting of a garage door opener signal, a car alarm signal, a remote keyless entry device signal, a wireless door bell signal, a toy remote control signal, an FRS signal, a GMRS signal, cellular telephone ringing signal, and a pager signal. However, this is not meant as a limitation.

In another embodiment of the present invention, the interference parameters are selected from the group consisting of a rise time, a pulse width, and pulse repetition rate expressed in pulses per unit of time (PRR), sometimes also referred to as a pulse repetition frequency (PRF), expressed in Hertz (cycles per second). The pulse rate may be varied randomly over time (referred to herein as dithering) or predictably over time (referred to as introducing jitter)

In another embodiment of the present invention, UWB signal is amplified prior to transmitting the UWB signal to the RTED receiver. In still another embodiment, the UWB signal is filtered prior to amplification.

In still another embodiment of the present invention, an alternate set of predetermined interference parameters is substituted for the predetermined interference parameters. An alternate UWB signal is created using the alternate predetermined interference parameters and transmitted.

In an embodiment of the present invention, a system for protecting personnel from RF-triggered explosive devices (RTEDs) comprises a pulse generator, a UWB transmitter, and a wideband antenna. According to embodiments of the present invention, the RTED may be either a manufactured RTED or an improvised RTED. The pulse generator receives predetermined interference parameters associated with an RTED transmission signal comprising a bit stream. The pulse generator triggers a UWB transmitter with the received predetermined interference parameters. The UWB transmitter produces a UWB signal in response to a pulse generator. A wideband antenna receives the UWB signal and broadcasts it.

In another embodiment of the present invention, the system further comprises a memory and a processor. The memory comprises a library of sets of predetermined interference parameters. The processor retrieves a set of predetermined interference parameters from the library send the set of predetermined interference parameters to the pulse generator.

In yet another embodiment of the present invention, the system comprises a wideband amplifier. The wideband amplifier receives the UWB signal from the UWB transmitter, amplifies the UWB signal, and provides the amplified UWB signal to the wideband antenna. In embodiments of the present invention, the wideband amplifier is selected from the group consisting of a linear amplifier, a nonlinear amplifier, and a programmable amplifier wherein a linearity characteristic of the amplifier is responsive to commands from the processor. In still another embodiment of the present invention, the system comprises a filter and a wideband amplifier. The filter receives the UWB signal from the UWB transmitter, passes a selected bandwidth of the UWB signal, and provides the selected bandwidth of the UWB signal to the wideband amplifier. The wideband amplifier receives the selected bandwidth of the UWB signal from the filter, amplifies the selected bandwidth of the UWB signal, and provides the amplified selected bandwidth of the UWB signal to the wideband antenna. In embodiments of the present invention, the filter is selected from the group consisting of a band pass filter, a band blocking filter, and a programmable filter wherein a frequency response characteristic of the filter is responsive to commands from the processor.

DETAILED DESCRIPTION

The following terms are used in the description that follows. The definitions are provided for clarity of understanding:

| | |
|---|---|
| dither | Varying the pulse repetition rate randomly over time. |
| FSK | Frequency-Shift-Keying. A form of RF signal modulation |
| RTED | RF-triggered explosive device. A RTED may be manufactured or improvised. |
| jitter | Varying the pulse repetition rate predictably over time. |
| LOS | Line of sight. |
| OOK | On-Off-Keying. A form of RF signal modulation. |
| PRR | Pulse repetition rate. |
| PW | Pulse width |
| RF | Radio frequency. |
| RKE | Remote keyless entry. |
| UWB | Ultra wide bandwidth. |

According to embodiments of the present invention, an ultra wideband (UWB) jamming system comprises a processor, a memory, a pulse generator, a UWB transmitter, and an UWB antenna. The UWB jamming system uses UWB signals to create errors in the code sent from an RTED triggering device to the RTED receiving device before the RTED trigger signal can cause the RTED to detonate. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver.

In one embodiment of the present invention, a set of interference parameters is selected from the group consisting of a pulse rise time, a PRR, and a PW. A processor receives an interference parameter set and instructs a pulse generator to drive a UWB transmitter to generate a waveform meeting the interference parameters of the selected interference parameter set. The UWB signal is then broadcast via a UWB antenna. As a result of the selection of the interference parameters, the UWB signal has a statistically high probability of introducing an error in the code received by the RTED receiver to which the RTED detonation signal is sent.

The pulse rate may be varied randomly over time (referred to herein as dithering) or predictably over time (referred to as introducing jitter)

In another embodiment of the present invention, a set of predetermined interference parameters is defined for a plurality of RTED triggering devices. The interference parameter sets for the plurality of devices is stored in a memory and retrieved by the processor. The processor instructs a pulse generator to drive a UWB transmitter to generate a signal using the interference parameter sets for the plurality of RTED triggering devices. The UWB signal is then broadcast via a UWB antenna. The UWB signal has a statistically high probability of introducing an error in the code received by in the RTED receivers associated with the plurality of RTED triggering devices.

Figure 1:
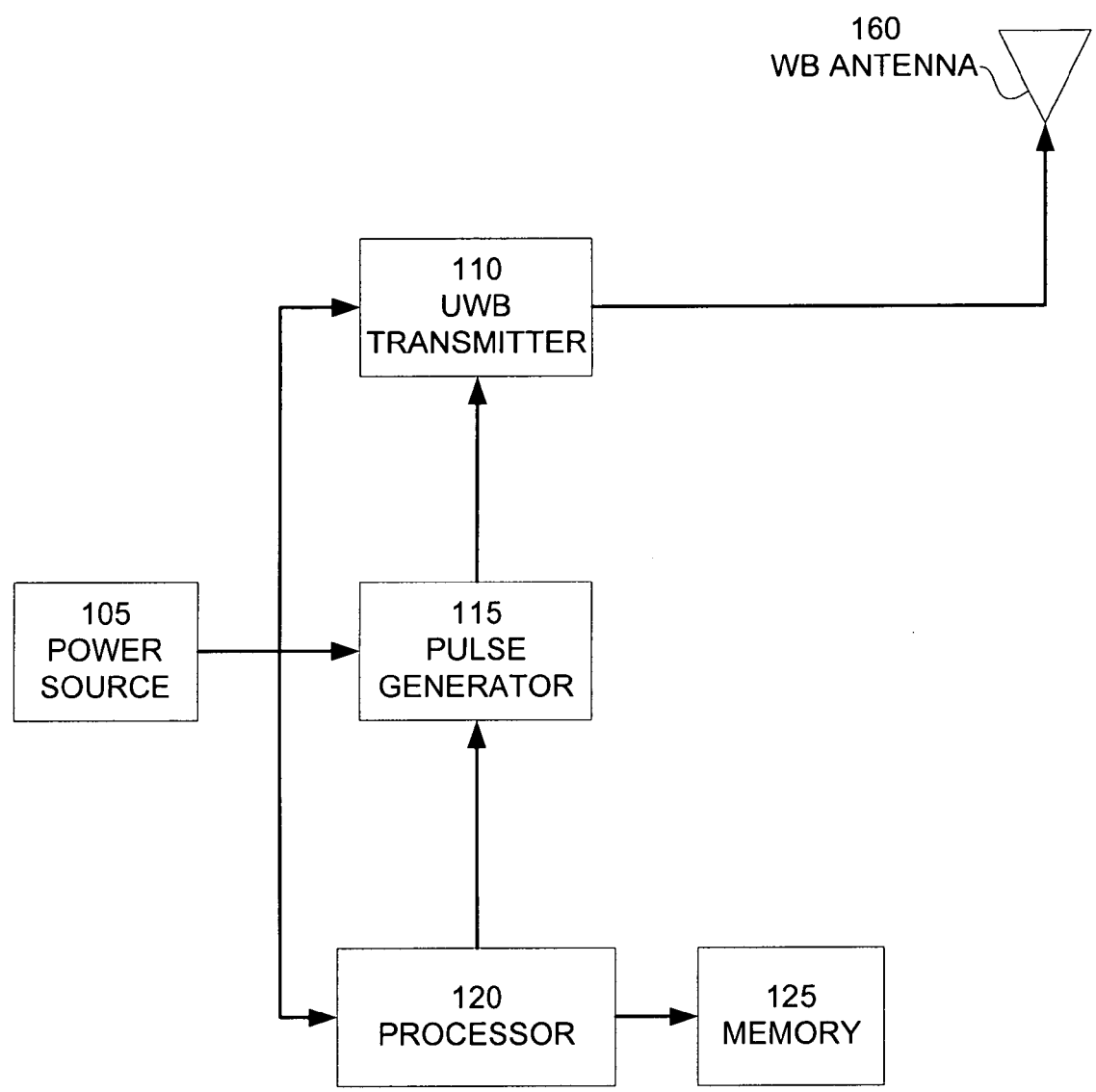
FIG. 1 illustrates a UWB jamming system according to an embodiment of the present invention.

FIG. 1 illustrates a UWB jamming system according to an embodiment of the present invention. Referring to in FIG. 1, UWB jamming system 100 comprises a power source 105, a UWB transmitter 110, a pulse generator 115, a processor 120, a memory 125, and broadband antenna 160.

In an embodiment of the present invention, memory 125 comprises a library of interference parameter sets. An interference parameter set comprises parameters that define a waveform that, when transmitted by UWB jamming system 100, will interfere with a particular RTED trigger signal. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver. In this embodiment of the present invention, a set of interference parameters comprises a PRR, a PW, and a pulse rise time. An interference parameter set is retrieved by processor 120 from memory 125 and sent to pulse generator 115. Pulse generator 115 controls UWB transmitter 110 to produce a UWB pulse reflecting the pulse rise time, the PW, and the PRR of the selected interference parameter set. The output of the UWB transmitter 110 is sent to broadband antenna 160 for transmission. In one embodiment of the present invention, the UWB transmitter 110 supplies a double exponential pulse.

In another embodiment of the present invention, a set of predetermined interference parameters is defined for a plurality of RTED triggering devices. The interference parameter sets for the plurality of devices is stored in memory 125 and retrieved by processor 120. The processor 120 instructs pulse generator 115 to drive a UWB transmitter 110 to generate a signal using the interference parameter sets for the plurality of RTED triggering devices. The UWB signal is then broadcast via broadband antenna 160. The UWB signal has a statistically high probability of introducing an error in the code received by the RTED receivers associated with the plurality of RTED triggering devices.

In another embodiment of the present invention, the pulse generator 115 is further adapted to vary the PRR over time by introducing a jitter or dither component into the signal sent to the UWB transmitter 110. Application of dithering, modulation, and jitter to the pulse generator causes the UWB signals to be distributed more uniformly across the spectrum of interest.

Figure 2:
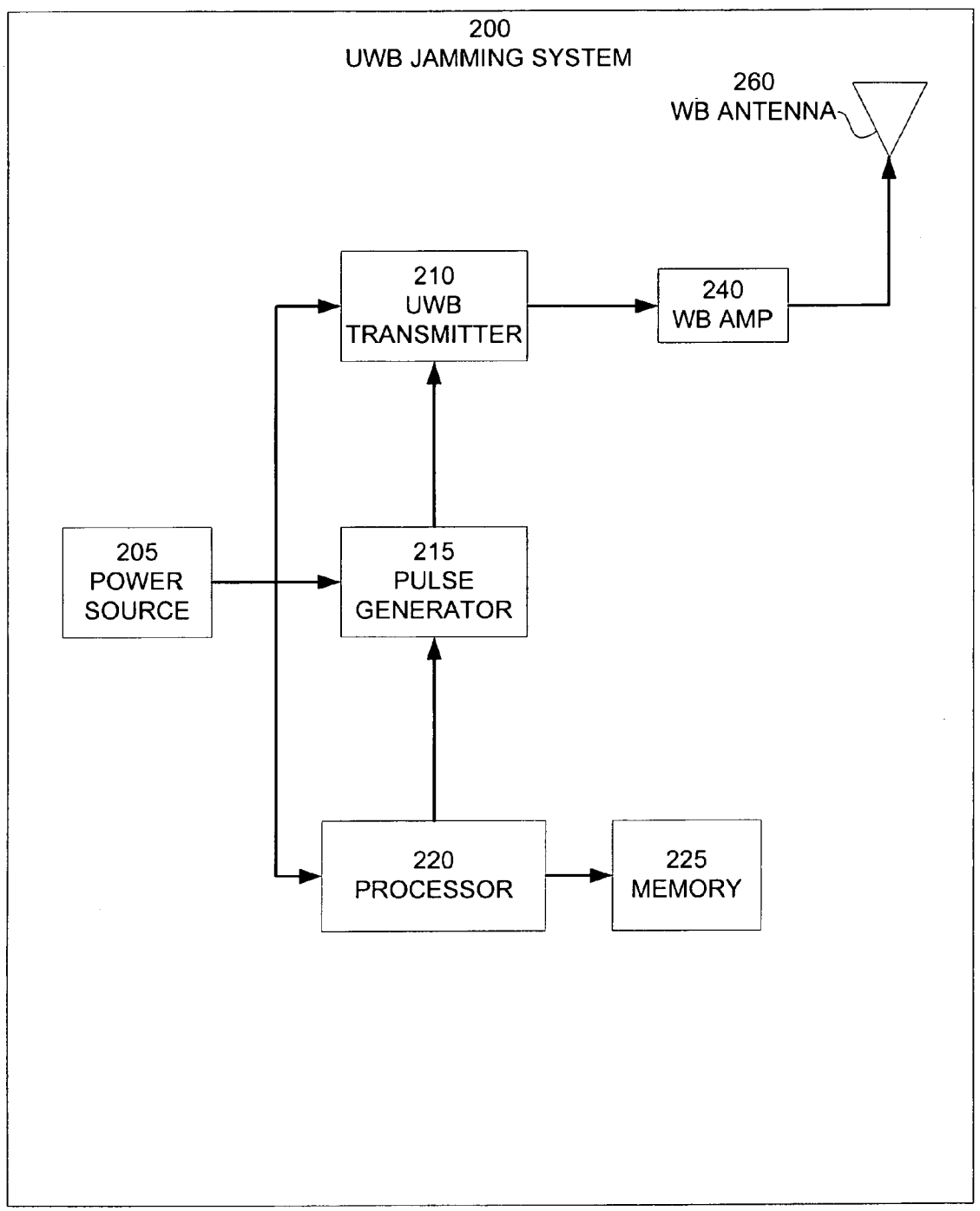
FIG. 2 illustrates a UWB jamming system utilizing a wideband amplifier according to an embodiment of the present invention.

FIG. 2 illustrates a UWB jamming system utilizing a wideband amplifier according to an embodiment of the present invention. Referring to FIG. 2, UWB jamming system 200 comprises a power source 205, a UWB transmitter 210, a pulse generator 215, a processor 220, a memory 225, a wideband amplifier 240, and broadband antenna 260. In this embodiment of the present invention, the output of UWB transmitter 210 is further amplified to provide more power to the jamming signal.

Figure 3:
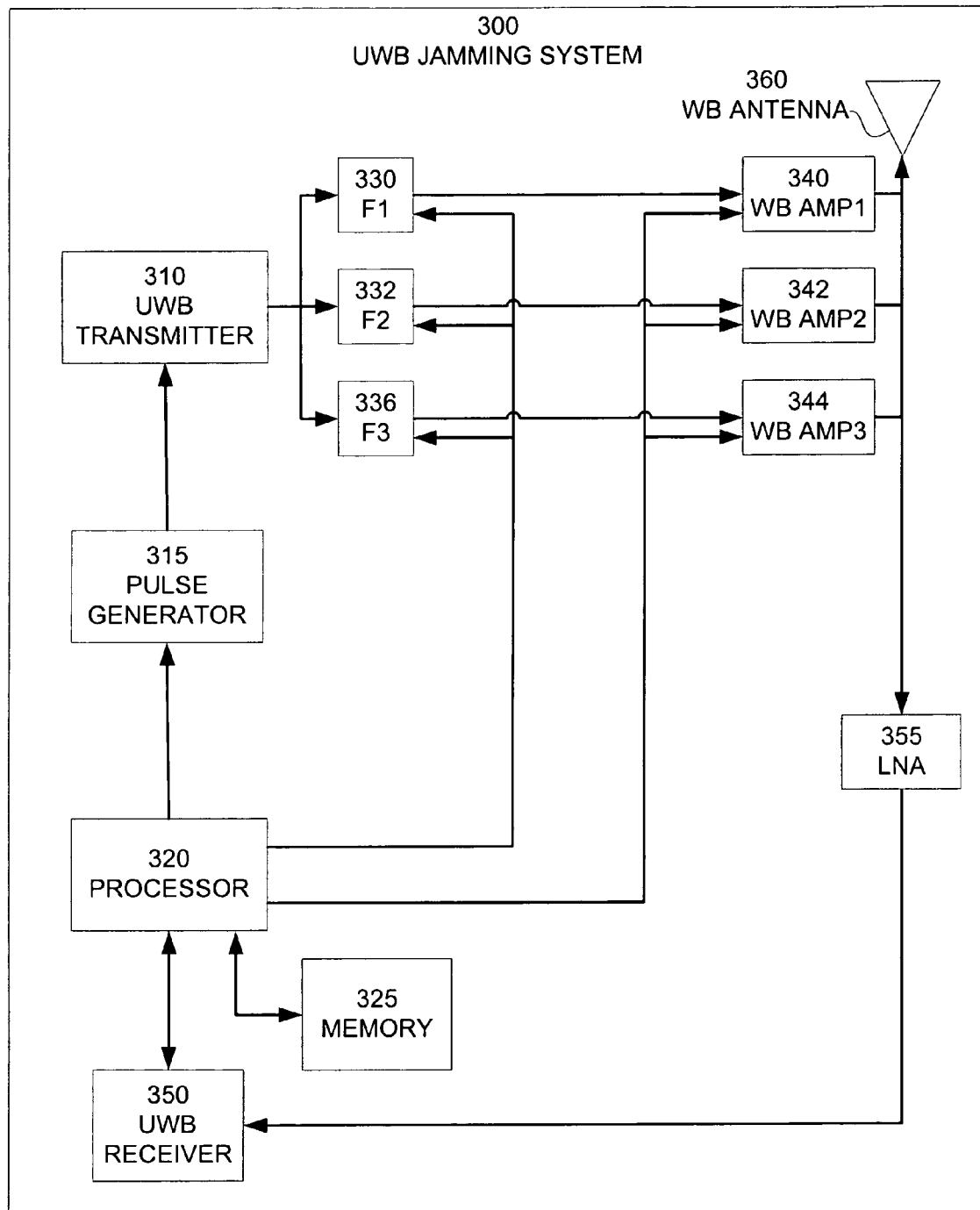
FIG. 3 illustrates a UWB jamming system utilizing a processor-controlled filters and amplifiers according to an embodiment of the present invention

FIG. 3 illustrates a UWB jamming system utilizing a processor-controlled filters and amplifiers according to an embodiment of the present invention. Referring to FIG. 3, UWB jamming system 300 comprises a UWB transmitter 310, a pulse generator 315, a processor 320, a memory 325, filters F1, F2, and F3 (330, 332, and 336) a wideband amplifiers WB Amp1, WB Amp2, and WB Amp3 (340, 342, and 344), and broadband antenna 360. UWB jamming system 300 further comprises a power source that was not illustrated for clarity that powers UWB receiver 350, processor 320, pulse generator 315, UWB transmitter 310, LNA 355, and WB amps 340, 342, and 344.

In an embodiment of the present invention, memory 325 comprises a library of interference parameter sets. An interference parameter set comprises parameters that define a waveform that, when transmitted by UWB jamming system 300, will interfere with a particular RTED trigger signal. In an exemplary embodiment of the present invention, the RF signals of the RTED triggering device are evaluated and a set of interference parameters are defined for the RF signal of that device. The interference parameters are predetermined to interfere with the reception of the RF signal of that device by an RTED receiver. In an embodiment of the present invention, a set of interference parameters comprises pulse parameters, filter parameters, and amplifier parameters. In an exemplary embodiment of the present invention, the pulse parameters comprise a PRR, a PW, and a pulse rise time; the filter parameters comprise low band, mid-band and high-band filter tuning parameters; and the amplifier parameters comprise linearity and power parameters. However, this is not meant as a limitation. As will be appreciated by those skilled in the art, other interference parameters may be used in conjunction with the elements of the UWB jamming system without departing from the scope of the present invention.

An interference parameter set is selected by processor 320 from memory 325. The processor 320 directs pulse parameters to pulse generator 315. In an exemplary embodiment of the present invention, the pulse parameters comprise a PRR, a PW, and a pulse rise time. In this exemplary embodiment, pulse generator 315 controls UWB transmitter 310 to produce a UWB pulse reflecting the pulse rise time, the PW, and the PRR of the selected interference parameter set. The process continues until each set of interference parameters has been selected. In an exemplary embodiment of the present invention, the process of generating UWB pulses using the library of interference parameters held in memory 325 is completed within 30 ms, which is less than the time for an RTED triggering device to send the required bit streams to the RTED receiver. In this way, an area at risk for RTEDs may be "swept" and protected against the use of a variety of possible RTED triggering devices.

While UWB transmitter 310 is illustrated as single object, this is not meant as a limitation. In an embodiment of the present invention, UWB transmitter 310 comprises an array of UWB transmitter chips. In still another embodiment of the present invention, the UWB transmitter chips within the array produce UWB signals covering different portions of the spectrum, thereby producing a composite RF output signal at antenna 360 that is limited only by the bandwidth of antenna 360.

The RF signal from UWB transmitter 310 is fed to filters F1, F2, and F3 (330, 332, and 336) that further shape the waveform. In an embodiment of the present invention, filters F1, F2, and F3 (330, 332, and 336) are controlled by processor 320 in response to filter parameters established in the selected interference parameter set. By way of illustration and not as a limitation, the filter parameters comprise tuning parameters such that filter F1 330 comprises a blocking filter that affects a low frequency band of the UWB spectrum, filter F2 332 comprises a bandpass filter that affects a mid-frequency band of the UWB spectrum, and filter F3 336 comprises a blocking filter that affects a narrow portion of the high-frequency band of the UWB spectrum. The filter parameters, in conjunction with the waveform produced by pulse generator 315 in response to the pulse parameters, can be used to emphasize bands within the UWB spectrum so as to minimize interference with desired communication signals while maximizing the jamming effectiveness of the signal generated by the UWB jamming system 300.

The outputs of filters F1, F2, and F3 (330, 332, and 336) are fed to wideband amplifiers WB Amp1, WB Amp2, and WB Amp3 (340, 342, and 344) respectively. While three amplifiers are illustrated in FIG. 3, as will be appreciated by those skilled in the art, the number of power amplifiers may be varied without departing from the scope of the present invention.

In this embodiment, the use of multiple wideband amplifiers serves to disperse the power consumption of the amplification stage of the UWB jamming system 300 across a plurality of amplifiers. By "tuning" the amplifiers to provide non-linear amplification, the RF energy as measured by the power spectral density can be directed to the frequency bands that are most likely to interfere with the RTED trigger signal. Additionally, the peak power of the jamming signal may be controlled to provide a power level appropriate to the type of RTED trigger being used. It is anticipated that wideband amplifiers with a peak power of between 10–100W will be desirable. As noted, the wideband amplifiers used in the present invention need not be linear, and in fact non-linearity can be beneficial in the generation of additional sidelobe frequencies.

The signal from filters F1, F2, and F3 (330, 332, and 336), as amplified by wideband amplifiers WB Amp1, WB Amp2, and WB Amp3 (340, 342, and 344), are combined at broadband antenna 360. In an embodiment of the present invention, broadband antenna 360 is omni-directional in the horizontal plane across a frequency range of 20 MHz to 5.4 GHz.

In an embodiment of the present invention, UWB jamming system 300 further comprises a UWB receiver 350. UWB receiver is connected to processor 320 and to broadband antenna 360 via low noise amplifier 355. In this embodiment, UWB receiver 350 receives communication signals comprising interference parameter sets and updates to existing sets, and sends these data to memory 325 via processor 320.

As will be appreciated by those skilled in the art, the a plurality of UWB jamming systems 300 may be deployed in the field and operated simultaneously to render an area safe from RTEDs. In an embodiment of the present invention, a plurality of UWB jamming systems are operated in vehicles in close proximity to each other and within the area to be jammed. The UWB jamming systems in these vehicles may be adapted to simultaneously transmit UWB signals directed to different groups of possible RTED triggering devices. In this way, a wide range of different RTED triggering devices may be effectively jammed during a specific window of time.

While a purpose of the invention is to cause EMI to jam the reception of the RF trigger signals of RTEDs, it is also desirable that the UWB signals not interfere with "friendly" signals such as Global Positioning System (GPS), radars and communications. In yet another embodiment of the present invention, UWB receiver 350 receives risk assessment data that characterizes the risk of the presence of an RTED at a particular location. The risk assessment data is used by processor 320 to select an interference parameter set that is suitable for the risk level faced by a user of UWB jamming system 300 while minimizing interference to desirable signals. By way of illustration, if a user of UWB jamming system 300 were determined to be at high risk of an RTED triggered by a cell phone, the power level of a waveform would be increased (to the possible detriment of other communications) until the risk level is reduced.

In another embodiment of the present invention, UWB receiver 350 detects the presence of RF signals within the spectrum known to be used by RTED trigger signals. Upon detection of a potential RTED trigger signal, UWB receiver 350 sends signal identifying information of the received signal to processor 320. Processor 320 compares the signal identifying information to a library of known RTED trigger signal "fingerprints" stored in memory 325. If the signal identifying information matches an RTED trigger signal "fingerprint," an interference parameter set is selected that when used to generate a UWB signal will create errors in the code sent from an RTED trigger signal to the RTED receiver thereby preventing detonation of the RTED.

In another embodiment of the present invention, the RTED trigger signal comprises a first and second bitstream. UWB receiver 350 detects the presence of RF signals within the spectrum known to be used by RTED trigger signals. Upon detection of a potential RTED trigger signal, UWB receiver 350 sends signal identifying information of the received signal to processor 320. Processor 320 compares the signal identifying information to a library of known RTED trigger signal "fingerprints" stored in memory 325. If the signal identifying information matches an RTED trigger signal "fingerprint," processor 325 selects the interference parameter set associated with the matching RTED trigger signal "fingerprints" and deduces the second bitstream from the first bitstream. The processor then modifies the RTED trigger signal "fingerprints" as necessary to transmit a UWB signal that is designed to create errors in the second bitstream sent from an RTED trigger signal to the RTED receiver thereby preventing detonation of the RTED.

In another embodiment of the present invention, UWB receiver 350 provides connectivity to a wireless network, thereby permitting UWB jamming system 300 to provide network communications when jamming of RTED trigger signals is not required.

A system and method for using UWB to block the various RF links used to trigger RTEDs has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method of protecting personnel from radio frequency (RF)-triggered explosive devices (RTEDs), wherein the RTED is intended to explode upon reception of a RTED transmission signal at a RTED receiver, comprising:

associating predetermined interference parameters with the RTED transmission signal,
wherein the RTED transmission signal comprises a bit stream;
creating an ultra-wideband (UWB) signal meeting the predetermined interface parameters; and
transmitting the UWB signal thereby interfering with the reception of the bit stream by the RTED receiver.

2. The method of protecting personnel from RTEDs of claim 1, wherein the RTED transmission signal is selected from the group consisting of a garage door opener signal, a car alarm signal, a remote keyless entry device signal, a wireless door bell signal, a toy remote control signal, family radio service (FRS) signal, a general mobile radio service (GMRS) signal, cellular telephone ringing signal, and a pager signal.

3. The method of protecting personnel from RTEDs of claim 1, wherein the interference parameters are selected from the group consisting of a rise time, a pulse width, and pulse repetition rate.

4. The method of protecting personnel from RTEDs of claim 3, wherein the method further comprises varying the pulse repetition rate randomly over time.

5. The method of protecting personnel from RTEDs of claim 3, wherein the method further comprises varying the pulse repetition rate predictably over time.

6. The method of protecting personnel from RTEDs of claim 1 further comprising amplifying the UWB signal prior to transmitting the UWB signal to the RTED receiver.

7. The method of protecting personnel from RTEDs of claim 6 further comprising, before amplifying the UWB signal, filtering the UWB signal.

8. The method of protecting personnel from RTEDs of claim 1 further comprising:
substituting an alternate set of predetermined interference parameters for the predetermined interference parameters;
creating an alternative UWB signal using the alternate predetermined interface parameters; and
transmitting the alternate UWB signal.

9. The method of protecting personnel from RTEDs of claim 1, wherein the RTED is selected from the group consisting of a manufactured RTED and an improvised RTED.

10. A system for protecting personnel from radio frequency (RF)-triggered explosive devices(RTEDs), wherein the RTED is intended to explode upon reception of a RTED transmission signal at a RTED receiver, comprising:
an ultra-wideband (UWB) transmitter;
a pulse generator adapted to:
receiver predetermined interference parameters associated with the RTED transmission signal, wherein the RTED transmission signal comprises a bit stream; and
trigger the UWB transmitter with the received predetermined interference parameters;
the UWB transmitter adapted to produce a UWB signal in response to the pulse generator; and
a wideband antenna adapted to receive the UWB signal and broadcast the UWB signal.

11. The system of claim 10, wherein the RTED transmission signal is selected from the group consisting of a garage door opener signal, a car alarm signal, a remote keyless entry device signal, a wireless door bell signal, a toy remote control signal, a family radio service (FRS) signal, a general mobile radio service(GMRS) signal, cellular telephone ringing signal, and a paper signal.

12. The system of claim 10, wherein the interference parameters are selected from the group consisting of a rise time, a pulse width, and pulse repetition rate.

13. The system of claim 12, wherein the pulse generator is further adapted to vary the pulse repetition rate randomly over time.

14. The system of claim 12, wherein the pulse generator is further adapted to vary the pulse repetition rate predictably over time.

15. The system of claim 10, wherein the system further comprises:
   a memory, wherein the memory comprises a library of sets of predetermined interference parameters; and
   a processor, wherein the processor is adapted to:
      retrieve a set of predetermined interference parameters from the library; and
      send the set of predetermined interference parameters to the pulse generator.

16. The system of claim 10 further comprising a wideband amplifier, wherein the wideband amplifier is adapted to:
   receive the UWB signal from the UWB transmitter;
   amplify the UWB signal; and
   provide the amplified UWB signal to the wideband antenna.

17. The system of claim 16, wherein the wideband amplifier is selected from the group consisting of a linear amplifier, a nonlinear amplifier, and a programmable amplifier wherein a linearity characteristic of the amplifier is responsive to commands from the processor.

18. The system of claim 10 further comprising a filter and a wideband amplifier, wherein the filter is adapted to:
   receive the UWB signal from the UWB transmitter;
   pass a selected bandwidth of the UWB signal; and
   provide the selected bandwidth of the UWB signal to the wideband amplifier; and
wherein the wideband amplifier is adapted to:
   receive the selected bandwidth of the UWB signal from the filter;
   amplify the selected bandwidth of the UWB signal; and
   provide the amplified selected bandwidth of the UWB signal to the wideband antenna.

19. The system of claim 18, wherein the wideband amplifier is selected from the group consisting of a linear amplifier, a nonlinear amplifier, and a programmable amplifier wherein the linearity is responsive to commands from the processor.

20. The system of claim 18, wherein the filter is selected from the group consisting of a band pass filter, a band blocking filter, and a programmable filter wherein a frequency response characteristic of the filter is responsive to commands from the processor.

21. The system of claim 10, wherein the RTED is selected from the group consisting of a manufactured RTED and an improvised RTED.

* * * * *